May 8, 1962 J. M. HANSEN 3,034,068

READ AMPLIFIER

Filed Nov. 30, 1956 2 Sheets-Sheet 1

Jay M. Hansen,
*INVENTOR.*

*BY.*

*AGENT.*

Jay M. Hansen,
INVENTOR.
BY
Edw. A. Oser
AGENT.

United States Patent Office 3,034,068
Patented May 8, 1962

3,034,068
READ AMPLIFIER

Jay M. Hansen, Santa Monica, Calif., assignor to Hughes Aircraft Company, Culver City, Calif., a corporation of Delaware Filed Nov. 30, 1956, Ser. No. 628,947
1 Claim. (Cl. 330—95)

This invention relates to magnetic recording systems for digital computers and more particularly to electrical apparatus for reading and reliably reproducing magnetically stored binary coded electrical information.

Binary coded electrical information may be stored on magnetic mediums, such as magnetic drums, tapes, and the like by many recording techniques. Some techniques for recording on magnetic mediums are described in a text entitled "High-Speed Computing Devices" by the Engineering Research Associates, published in 1950 by the McGraw-Hill Book Co., beginning on page 322 thereof. One of these described recording techniques is identified as the Non-Return-to-Zero (NRZ) system. When binary information is recorded by this NRZ recording technique, the discrete areas or binary cells on the magnetic storage medium are magnetically oriented in one of two directions to represent binary coded information. The information in these binary cells is continually sensed and an electrical signal corresponding to the sensed magnetic state is generated. This process is commonly termed "reading" and in an NRZ system the largest read signal will be produced at the boundary between successive binary cells having different binary states or binary information recorded therein. It is characteristic of the NRZ recording system that a useful output signal is generally desired only when a change in binary states has been detected and to exclude any other signals from being coupled into the associated digital circuit.

Various reading circuit arrangements have heretofore been employed in association with the magnetic read head to reliably reproduce the detected binary signals. These techniques have included merely amplifying the detected signal and applying the amplified signal to coincident gates prior to application to the digital computing circuitry proper. Another reading circuit arrangement that has been employed is described and claimed in the copending application of Daniel L. Curtis entitled "Variable Impedance Output Circuit," Serial No. 322,765, filed November 26, 1952 and now matured into Patent No. 2,775,714 which is assigned to the same assignee as this application. The reading circuit arrangement described in this copending application is characterized by a variable impedance output circuit for controlling the signal derived from the read amplifier. The impedance of the output circuit is arranged to be variable in response to the input signal so as to reproduce the input signal only during the intervals it exceeds a predetermined level by presenting a relatively high impedance thereto at those times. This variable impedance output circuit however, while operable and satisfactory to a degree, does not afford a stable, clearly defined reading characteristic. It also presents some problems in making the magnetic storage apparatus function and continue to function properly, resulting in the continual adjustment of circuit values, transducing heads, and the like. Accordingly, the aforementioned prior art reading circuits failed to attain read amplifier characteristics of a character presently considered desirable.

It is therefore a general object of this invention to provide improved and more reliable reading apparatus for use in a computer, that affords a clearly defined reading characteristic, thereby allowing increased margins in parameter values in the associated circuitry and storage medium.

It is another object of this invention to provide improved reading apparatus for use in reproducing binary coded magnetically stored information wherein a very sharp threshold level is defined to discriminate against noise and which level is arranged to be independent of tube and circuit variations.

It is a further object of this invention to provide improved reading apparatus utilizing a minimum of parts for reproducing magnetically stored binary coded information wherein a stable, sharp threshold level is defined for positively reproducing only the detected changes in the state of binary information so as to cause the reading apparatus to function as a three-position switch.

In accordance with this invention the improved reading amplifier utilizes a feedback loop including an associated non-linear circuit element for causing a high gain amplifier to function as a three-position switch. The feedback loop is arranged and functions in a novel manner for defining a sharp threshold level to eliminate noise and undesirable signal variations occurring particularly when binary information magnetically recorded by the NRZ recording technique is being read. The non-linear circuit element of the feedback loop permits the application of feedback current to the amplifier during the intervals that the applied read signal is within the threshold range, thereby rendering the read amplifier nonresponsive thereto. During the intervals that the read signal exceeds the threshold level, the non-linear circuit element acts to cut off the feedback current and allows the signal to be amplified to a relatively large extent. The threshold is narrowly defined by the feedback loop so that a small increment of read signal will be greatly amplified to produce a large output signal.

Further and additional objects and advantages will become apparent hereinafter during the detailed description of the embodiments of the invention which are to follow and which are illustrated in the accompanying drawings wherein.

Figure 1:
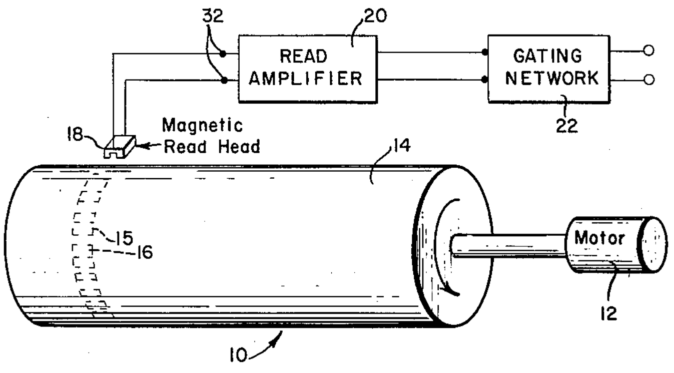
FIG. 1 is a perspective view of a magnetic storage medium and associated transducer and a block diagram of the circuitry coupled therewith.

Referring to the drawings, the magnetic storge medium 10 is shown as a conventional magnetic drum directly coupled to a drive motor 12 for rotation therewith. The general construction and operation of the magnetic drum 10 is well known in the computer art; and suffice it to say, for the purposes of this invention, that the outer peripheral surface of the drum is provided with a coating of a magnetizable material 14 capable of retaining a magnetic pattern thereon for relatively long periods of time. The magnetizable material 14 may have data recorded thereon in tracks, similar to the track identified by the reference character 15, of a predetermined width. Each data track 15 may be considered to be subdivided into discrete areas or cells 16 for storing binary coded electrical signals therein. These electrical signals are stored within the binary cells 16, preferably by the NRZ recording system, as explained in the aforementioned Engineering Research Associates' text. The stored data is derived from the magnetic drum 10 by means of a suitable magnetic transducer or read head 18 and the binary coded electrical signals derived from the drum in this manner are coupled into a read amplifier 20. The amplifier 20 functions to shape the signals so as to better define the desired binary coded portions thereof. It is recognized by those skilled in the computer art that when data is recorded by the NRZ system that the read signal resulting will be characterized by a relatively large output signal only when the data stored in successive cells represent different binary information, so as to produce a change in flux linkages at the read head 18. The resulting read signal provided by the read amplifier 20 may be coupled into the digital computer proper through circuitry such as a logical gating network 22 for further processing therein prior to application to a computer element, such as a flip-flop for example.

The read amplifier 20 is arranged, in accordance with this invention, to be responsive to the read signals so as to function in a manner similar to a three position switch. The response of the amplifier 20 is such as to provide an output signal whenever the input or read signal exceeds the threshold level in either the positive or negative sense while providing substantially no output when the read signal falls below the threshold level. The read amplifier 20 responds in this manner by the provision of a feedback circuit or loop 24 including a non-linear responsive element 26 coupled to the loop. Generally, the feedback loop 24 is arranged to interconnect the output and input circuits of the amplifier 20, so that the amplifier will be substantially non-responsive to the read signal over a predetermined range thereof, that is, when falling below a threshold voltage level. The non-linear element 26 is further arranged to be responsive to the feedback current provided by a read signal at the threshold level so as to substantially cut off the feedback current so that the output signal will rise rapidly, that is, a very small increase in input signal level will allow the output signal to rise rapidly.

Figure 2:
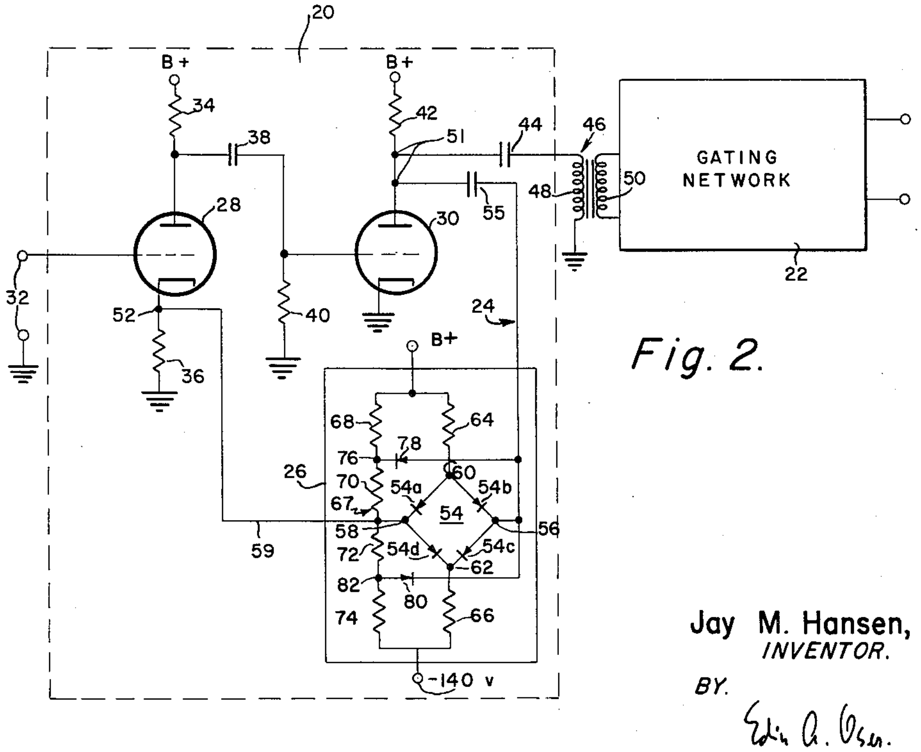
FIG. 2 is a circuit diagram of a read amplifier embodying the invention.

The read amplifier shown in FIG. 2 comprises a pair of electron discharge devices shown as triodes 28 and 30 arranged as high gain amplifiers cascaded in a conventional manner and provided with a feedback circuit or loop 24. The feedback loop 24 including non-linear circuit element 26 is coupled between the output circuit of the triode 30 and the input circuit of the triode 28.

The input circuit of triode 28 is defined by the grid-cathode circuit thereof to receive the read signal between the grid and ground at input terminals 32. The anode for the triode 28 is connected to the B+ terminal of a power supply having the B− terminal grounded, through an anode resistor 34 while the cathode is provided with an un-bypassed resistive impedance 36 connected between the cathode and ground. The output signal derived from the anode circuit of the triode 28 is coupled into the input or grid-cathode circuit of triode 30 by means of the resistor 34 and a coupling capacitor 38. The capacitor 38 is connected between the anode of triode 28 and the grid of triode 30 while a grid leak resistor 40 is connected between the same grid and ground. The anode of triode 30 is connected to the B+ terminal of the power supply through a resistive impedance device 42, with the cathode thereof connected directly to ground. The resulting amplified signal derived from the output or anode circuit of triode 30 is coupled by means of capacitor 44 to a transformer 46. The capacitor 44 is connected between the anode of triode 30 and an end of primary coil 48 of transformer 46. The remaining end of primary coil 48 is connected to ground while a secondary transformer coil 50 is coupled into the gating network 22.

An important feature of this invention is the provision of the feedback loop 24 including non-linear circuit element 26. The non-linear circuit element 26 is included in the feedback loop 24 to pass the feedback current when the read signal falls within a threshold voltage range and to substantially cut off the passage of the feedback current when the read signal exceeds the threshold level. The feedback loop 24 is connected to the anode of the triode 30 at junction point 51 to pass a feedback current through the non-linear element 26 to the cathode resistor 36 of triode 28 at junction point 52. It will be recognized by those skilled in the art that the current fed back in this manner is negative feedback.

The non-linear circuit element 26 in this embodiment, includes a bridge circuit 54 connected into the feedback circuit 24 at a pair of diagonally opposite junction points 56 and 58 thereof. The bridge circuit 54 is connected into the anode output circuit of triode 30 by means of a coupling capacitor 55 connected between junctions 56 and in junction 51. Each of the arms of the bridge circuit 54 includes the usual diode element identified by the reference character 54 and one of super-scripts *a*, *b*, *c* and *d* and shown as crystal diodes. The diode $54^b$ is arranged with its cathode connected to junction 56 in common with the anode of diode $54^c$. The cathode of diode $54^a$ is connected at junction 58 in common with the anode of diode $54^d$, with a lead wire 59 connecting junctions 58 and 52. The remaining junction points of circuit 54 are identified by the reference characters 60 and 62. Diodes $54^a$ and $54^b$ each have their anodes connected to junction 60, while the cathodes of diodes $54^c$ and $54^d$ are connected in common with junction 62.

In accordance with this invention a source of constant current is connected to the bridge circuit 54 at junctions 60 and 62. The source of constant current is provided and arranged to maintain the current in the arms of the bridge circuit 54 in balance, that is equal currents therein, in the absence of a signal at input terminals 32. The constant current is provided in this instance by connecting junction 60 to the B+ terminal through a resistor 64, while junction 62 is connected to a point of negative potential in the power supply of approximately 140 volts through resistor 66. Connected in a parallel relationship with the bridge circuit 54 between the B+ terminal and the negative voltage terminal is a voltage dividing network 67 comprising the series resistors 68, 70, 72 and 74 serially arranged in that order with the resistor 68 connected to the B+ terminal and resistor 74 connected to the negative voltage terminal. The function of this voltage dividing network in combination with the bridge circuit 54 will be explained more fully hereinafter.

The non-linear circuit element 26 further includes a unilateral current device or diode 78 connected into network 67 at junction 76 intermediate the resistors 68 and 70 and into the feedback loop 24 at junction point 56 or in common therewith. The anode of the diode 78 is connected to junction point 56 while the cathode thereof is connected to junction point 78. Similarly, a diode 80 is connected at a junction 82 intermediate resistors 72 and 74 of network 67 and to junction 56. The anode of diode 80 is connected to junction 82 and the cathode thereof at junction 56. The resistors of voltage division network 67 are proportioned so that the voltages appearing at junction points 76 and 82 are of a magnitude to maintain the respective diodes 78 and 80 cut off or non-conducting until the anode voltage of triode 30 reaches a predetermined level.

Figure 3:
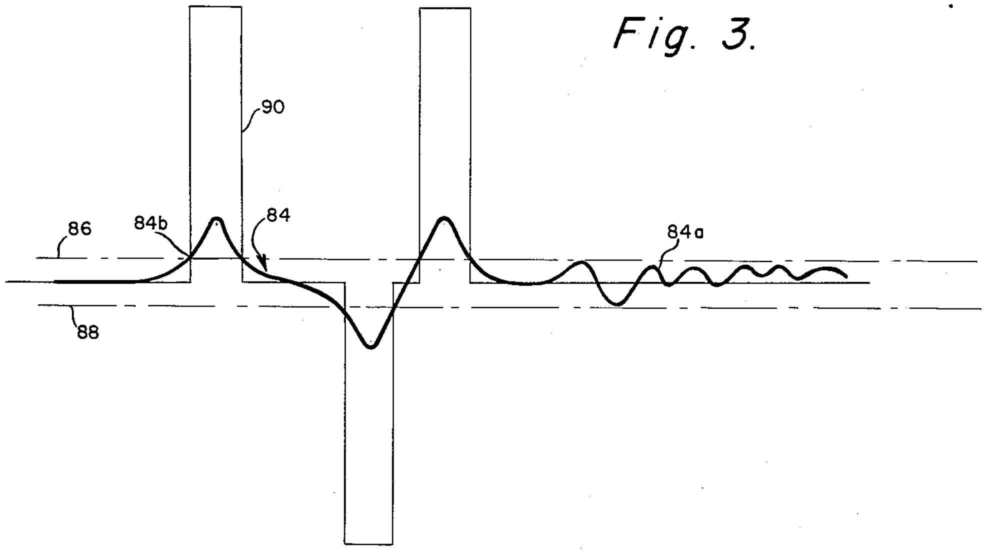
FIG. 3 is a graph representing typical input and output waveforms for the circuits of FIGS. 2 and 4.

With the above structure of the read amplifier 20 in mind the operation thereof will now be described in conjunction with the typical waveforms shown in FIG. 3. The read signal coupled into the read amplifier 20 at the terminals 32 may have a shape substantially as represented by the waveform 84 when an NRZ recording is read. The waveform 84 arbitrarily has been chosen to represent the binary information 0110111, with the positive excursions representing 1 and the negative excursions 0. The area defined between the dotted lines 86 and 88 of FIG. 3 define those portions of the read signal 84, which signal levels it is desired not to amplify. In other words, the dotted line 86 defines the positive threshold voltage level for the read signal 84 while the dotted line 88 defines the negative threshold level and any portion of the read signal falling between these two, such as the portions 84*a* of signal 84 will not be amplified and reproduced in the output circuit of the read amplifier 20. The feedback loop 24 is effective during these intervals to cause the amplifier to be non-responsive.

Assuming that there is no signal initially introduced into the read amplifier 20, the bridge circuit 54 will be in balance due to the constant current. Then, when the read signal 84 is introduced into the read amplifier 20 and as it rises from a zero level, a feedback current is produced in the loop 24. As the read signal 84 rises in the positive direction the voltage appearing at the output of triode 30 will also rise in a positive direction so as to produce a feedback current which enters the bridge 54 at junction 56 and passes through the parallel paths provided by the series diodes $54^a$ and $54^b$ and the series diodes $54^d$ and $54^c$ to resistor 36. The feedback current passing through diodes $54^a$ and $54^c$ causes an increase in current therein while decreasing the current passing through the diodes 54*b* and 54*d*. The feedback current passing through resistor 36 is proportioned in this manner so that the voltage developed across the resistor is approximately equal to the rise in input voltage.

Since the resistor 36 is not bypassed, the cathode voltage follows the grid voltage, and the read amplifier may be said to be non-responsive to the read signal during these intervals. This action continues until the feedback current passing through each of the diodes 54*b* and 54*d* equal the constant current therethrough at which time these diodes are opened up and thereby cut off the application of the feedback current to resistor 36. At these times all the constant current derived from the voltage source passes from the resistor 64 through the diode 54*a* to the cathode resistor 36 of triode 28. This action fixes the potential of the cathode of triode 28. When this occurs, the read signal 84 has reached the threshold level indicated at $84^b$, at the intersection of signal 84 and dotted line 86, and at this time the amplifier 20 has been arranged so that any further positive rise in the read signal 84 is amplified and passed into the gating network 22.

With the opening up of the feedback circuit 24 in this manner, any further increase in read signal will cause the output voltage to rise rapidly as a result of the high gain of the amplifiers 28 and 30. As the read signal continues to rise, a voltage level equal to the voltage across resistor 70 will be reached so as to cause the diode 78 to pass the feedback current and thereby function as a clipper for limiting the amplitude swing of the output signal and also to prevent a zero shift of the threshold, as may be appreciated by referring to the output waveform 90 of FIG. 3. The feedback current passing through diode 78 is applied into the input circuit of triode 28 through resistors 70 and 36 to ground. Upon the re-application of the feedback current in this manner the output of the read amplifier 20 is maintained at the clipping level until the read signal again falls below the threshold level at which level the feedback current is again zero. The output signal voltage will then fall rapidly until the diodes $54^b$ and $54^d$ in the bridge circuit 54 are again conducting. The input of the read amplifier 20 will then continue to follow the variations in the read signal 84 until the read signal level falls beyond the negative threshold level as indicated by the dotted line 88 whereupon the action will be substantially similar to that described for the positive variations. The feedback current passing through the bridge circuit 54 during these intervals will cause the current through diodes $54^b$ and $54^d$ to increase while the currents through diodes $54^c$ and $54^a$ are decreasing until they are eventually opened up. The output signal 90 will then rise rapidly in a negative direction by the amount of voltage provided at junction 82, until the diode 80 acts to clip the signal level by turning the feedback current back on. The voltages at junctions 76 and 82 should be substantially equal in value and of opposite polarity.

It should be noted that the range of read signal over which the output signal is ambiguous is narrow; that is the voltage range between lines 86 and 88. A change of approximately $\frac{1}{30}$ volt in read signal above the threshold level will produce a 25 volt output signal. It may now be appreciated that any signal variation falling above the threshold level will positively actuate the associated computer circuitry. Also, it should be noted that as the read signal varies due to noise such as may result when signals of the same binary value are presented to the read head 18, as represented by excursions 84*a*, the output signal 90 now remains at the reference level.

Figure 4:
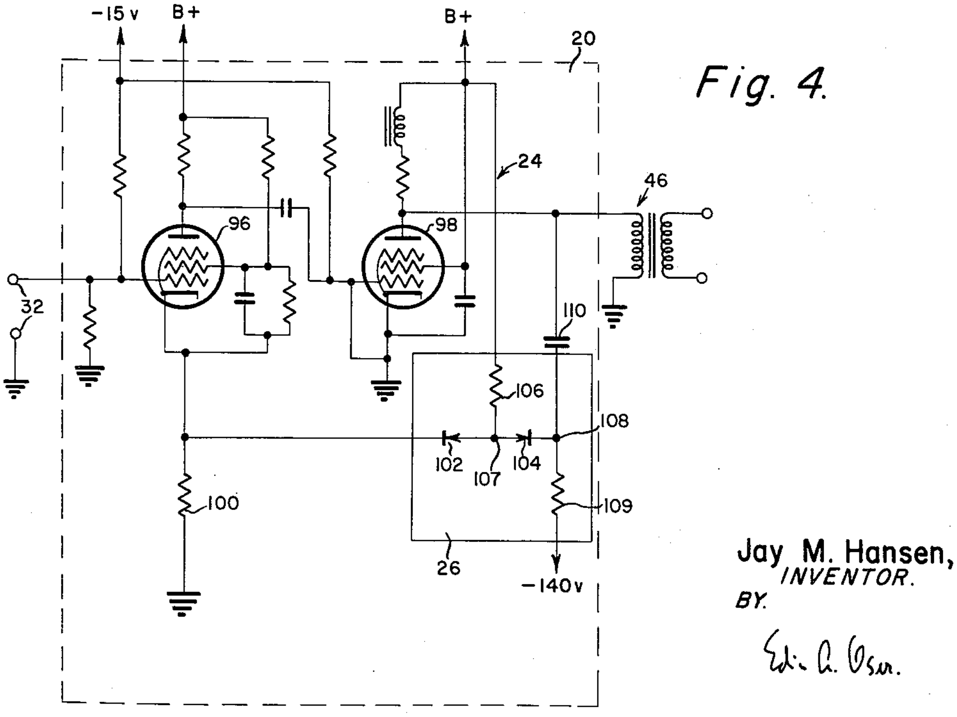
FIG. 4 is a circuit diagram of a modified read amplifier and embodying the invention.

Now referring to FIG. 4, another embodiment of the read amplifier 20 will be described. In this embodiment the read amplifier 20 comprises a pair of pentode tubes 96 and 98 cascaded and arranged in conventional amplifier fashion with the feedback loop 24 interconnecting the anode circuit of pentode 98 with the grid-cathode circuit of pentode 96. The feedback loop 24 in this instance also includes the non-linear circuit element 26. The general response of the read amplifier 20 of this embodiment is substantially similar to the response of the amplifier described hereinbefore.

The pentode 96 has its cathode provided with a resistor 100 and which resistor is connected between the cathode and ground and is also not bypassed just as cathode-resistor 36 was not in the previous embodiment. A read signal may be coupled into the grid-cathode circuit of pentode 96 by means of the input terminals 32 connected between the grid of the tube and ground. The pentodes 96 and 98 are coupled in conventional resistance-capacitance fashion so as to pass a signal therebetween. The resulting output signal derived from the anode circuit of pentode 98 is coupled into the output transformer 46. The electrodes of the pentodes 96 and 98 are connected to the power supply 33 in the usual pentode fashion and with the suppressor grid connected to the cathode.

The non-linear circuit element 26 in this instance utilizes a pair of Zener diodes 102 and 104. The anodes of diodes 102 and 104 are connected in common with resistor 106 at junction point 107. The remaining end of resistor 106 is connected to the B+ terminal of the power supply. The cathode of diode 104 is connected to junction point 108 in common with one end of resistor 109, having its opposite end connected to the negative 140 volt terminal. The feedback current is coupled into the circuit element 26 at junction point 108 by means of a capacitor 110 connected thereto and the anode of pentode 98. The cathode of diode 102 is directly connected to the cathode of pentode 96.

The characteristics of a Zener diode are well known in the art and it should suffice to say that the characteristic desired of the diodes 102 and 104 is the ability to conduct in a backward direction without destroying the diodes when a voltage of reverse polarity and of sufficient amplitude is applied across the diode. This breakdown voltage or Zener voltage of diodes 102 and 104 preferably should be of a voltage level effective to clip the output waveform at a level substantially similar to the one described in the previous embodiment.

A constant current is also provided in this embodiment for the element 26 to control the current in cathode resistor 100 of pentode 96. This constant current is derived from the power supply through resistor 106 and through diodes 102 and 104 by means of junction 107. The constant current dividing at junction 107 passes to resistor 100 and ground by means of diode 102 and to the negative 140 volt terminal by means of diode 104 and resistor 109. The current distribution of the constant current passing through the resistor 106 is proportioned so that the current passing through the resistor is twice the current passing through diode 104 and resistor 109 in the absence of a read signal at the input terminals 32.

Again, assuming the read signal 84 is applied at terminals 32, as the signal increases from zero in a positive direction the voltage at the output of pentode 98 will also rise in the positive direction. The rise in voltage appearing at the anode of pentode 98 is coupled to the cathode of diode 104 causing more of the constant current flowing through resistor 106 to be diverted through diode 102 and thereby through cathode resistor 100. This action causes the cathode to follow the grid of pentode 96 and the amplifier remains substantially non-responsive to the read signal 84. As the read signal 84 continues to increase in the positive direction, the current through diode 102 and resistor 100 continues to increase until the diode 104 is completely cut off, at which time the read signal 84 has reached the threshold voltage level 84b. At this time, all of the constant current passing through resistor 106 is now being passed through the diode 102. When all the constant current is bypassed through diode 102 and resistor 100, the potential of the cathode of pentode 96 is fixed with respect to ground and the pentode will now amplify any increase in read signal. Accordingly, when the read signal continues to increase above the threshold level 84b, the output will rise rapidly in a manner similar to that shown by the waveform 90.

When the output signal reaches the Zener voltage level for the diode 104, it will conduct in the reverse direction so as to pass a feedback current therethrough, and through diode 102 to resistor 100, thereby limiting the output voltage. This same action continues for the various changes in the read signal. When the read signal exceeds the negative threshold limit as represented by the line 88, the same action will occur except that the constant current now will be continually shifted from diode 102 to diode 104 until diode 102 is completely cut off. When diode 102 is completely cut off the voltage output is allowed to increase until diode 102 conducts in the reverse direction to cut it off and once again allow the feedback current to flow.

It is therefore apparent that the present invention has advanced the state of the art through the provision of a novel and improved reading amplifier that discriminates against noise through the definition of a very sharp and stable threshold voltage level. The sharp threshold level is maintained through the action of a discontinuous or non-linear feedback loop for the read amplifier. The non-linear feedback loop acts to cause the read amplifier to respond to the read signal in a manner similar to a three-position switch.

Having thus described the invention, what is claimed is:

In an amplifying circuit having an amplifier including anode, cathode and grid circuits, and an input and an output circuit, a bridge circuit having first, second, third and fourth arms connected to said cathode circuit at the junction between said first and fourth arms, and connected to said output circuit at the junction between said second and third arms, a diode in each of said arms, the diode in said first arm having its cathode connected to said cathode junction and the diode of said fourth arm having its anode connected to said cathode junction, the diode in said second arm being poled oppositely to the diode in said first arm and the diode in said third arm being poled oppositely to the diode in said fourth arm, a source of positive bias coupled through an impedance to the junction between said first and second arms, a source of negative bias coupled through an impedance to the junction between said third and fourth arms, a first resistor connected between said positive bias source and said cathode circuit, a diode having its cathode connected at an intermediate point on said first resistor and its anode connected to said output circuit, a second resistor connected between said source of negative bias and said cathode circuit, and a diode having its anode connected at an intermediate point on said second resistor and its cathode connected to said output circuit.

References Cited in the file of this patent

UNITED STATES PATENTS

| | | |
|---|---|---|
| 2,212,337 | Brewer | Aug. 20, 1940 |
| 2,284,102 | Rosencrans | May 26, 1942 |
| 2,369,066 | Maxwell | Feb. 6, 1945 |
| 2,534,060 | Roberts | Dec. 12, 1950 |
| 2,554,905 | Hawkins | May 29, 1951 |
| 2,603,688 | Cole et al. | July 15, 1952 |
| 2,719,964 | McGuigan | Oct. 4, 1955 |
| 2,748,269 | Slutz | May 29, 1956 |
| 2,887,542 | Blair et al. | May 19, 1959 |

FOREIGN PATENTS

| | | |
|---|---|---|
| 653,099 | Great Britain | May 9, 1951 |